(12) United States Patent
Fang et al.

(10) Patent No.: US 12,242,101 B2
(45) Date of Patent: Mar. 4, 2025

(54) ELECTRONIC DEVICE

(71) Applicant: InnoLux Corporation, Miao-Li County (TW)

(72) Inventors: Chi Fang, Miao-Li County (TW); Wei-Tsung Hsu, Miao-Li County (TW); Wei-Ning Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/668,742

(22) Filed: May 20, 2024

(65) Prior Publication Data

US 2024/0427073 A1    Dec. 26, 2024

(30) Foreign Application Priority Data

Jun. 20, 2023  (CN) .......................... 202310735459.5

(51) Int. Cl.
    *F21V 8/00*    (2006.01)
(52) U.S. Cl.
    CPC .................................. *G02B 6/0053* (2013.01)
(58) Field of Classification Search
    CPC ...................................................... G02B 6/0053
    See application file for complete search history.

(56) References Cited

U.S. PATENT DOCUMENTS

2011/0058389 A1    3/2011  Shiau
2024/0126002 A1*   4/2024  Tsang ................... G02B 6/0053

FOREIGN PATENT DOCUMENTS

CN    218273009 U  *  1/2023  .......... G02B 6/0051
TW    201109739 A     3/2011

* cited by examiner

*Primary Examiner* — Donald L Raleigh
(74) *Attorney, Agent, or Firm* — McClure, Qualey & Rodack, LLP (57) ABSTRACT

An electronic device includes a backlight module. The backlight module includes a light guide plate and a light pattern adjustment component disposed on the light guide plate. The side of the light pattern adjustment component that is adjacent to the light guide plate has a plurality of prismatic structures, and the side of the light pattern adjustment component that is away from the light guide plate has a plurality of structural unit rows. Each of the structural unit rows includes a plurality of structural units, and the angle between the arrangement direction of the structural units in one of the structural unit rows and the extension direction of one of the prismatic structures is within a range of 10-80°.

20 Claims, 8 Drawing Sheets

ELECTRONIC DEVICE

CROSS REFERENCE TO RELATED APPLICATIONS

This Application claims priority of China Patent Application No. 202310735459.5, filed on Jun. 20, 2023, the entirety of which is incorporated by reference herein.

BACKGROUND OF THE INVENTION

Field of the Invention

The present invention relates to an electronic device, and, in particular, to an electronic device that includes a backlight module.

Description of the Related Art

Light packets from a backlight module in existing electronic devices are small.

This results in a poor visual effect when the light from the backlight module is emitted to the panel. Therefore, it is necessary to investigate how to improve the above problems.

BRIEF SUMMARY OF THE INVENTION

An embodiment of the present invention provides an electronic device that includes a backlight module. The backlight module includes a light guide plate and a light pattern adjustment component disposed on the light guide plate. The side of the light pattern adjustment component which is adjacent to the light guide plate has a plurality of prismatic structures, and the other side of the light pattern adjustment component (the side which is away from the light guide plate) has a plurality of structural unit rows. Each of the structural unit rows includes a plurality of structural units, and the angle between the arrangement direction of the structural units in one of the structural unit rows and an extension direction of one of the prismatic structures is within a range of 10-80°.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The following disclosure provides many different embodiments, or examples, for implementing different features of the provided display device. Specific examples of components and arrangements are described below to simplify the present disclosure. These are, of course, merely examples and are not intended to be limiting. For example, if the description mentions that a first component is formed on a second component, it may include an embodiment in which the first and second components are in direct contact, or it may include an embodiment in which an additional component is formed between the first and second components, so that they are not in direct contact. In addition, the embodiments of the present disclosure may repeat component symbols and/or characters in different examples. This repetition is for the sake of brevity and clarity and is not intended to indicate the relationship between the various embodiments and/or aspects discussed.

Directional terms mentioned in the present disclosure, such as "up", "down", "front", "back", "left", "right" and similar terms, are only for reference to the direction of the drawing. Accordingly, the directional terms used herein are intended to illustrate and not to limit the disclosure.

In some embodiments of the present disclosure, terms related to joining and connecting, such as "connection", "interconnection" and similar terms, unless otherwise defined, may refer to two structures being in direct contact, or may also refer to two structures not being in direct contact and there being other structures between the two structures. The terms "joint" and "connection" may also include the situation where both structures are movable or both structures are fixed. In addition, terms "electrical connection" and "coupling" include all direct and indirect means of electrical connection.

In addition, "first", "second" and similar terms used in this specification or claims are used only to designate different components or to distinguish different embodiments or scopes, and are not intended to limit the upper or lower limit of the number of components, nor are they used to limit the sequence of manufacture or installation of the components.

In the following, terms such as "approximately", "about" or "substantially" approximately mean within 20%, or within 10%, or within 5%, or within 3%, or within 2%, or within 1%, or within 0.5% of given values or ranges. The values given here are approximate values, i.e. in the absence of specific indications of "about" or "substantially", the meaning of "about" or "substantially" may still be implied.

Unless otherwise defined, all terms (including technical and scientific terms) used herein have the same meaning as commonly understood by a person skilled in the art to which the disclosure pertains. It will be further understood that terms, such as those defined in commonly used dictionaries, should be interpreted as having a meaning consistent with the relevant technology and the context or background of this disclosure and will not be interpreted in an idealized or overly formal sense unless expressly so defined herein.

Some variations of the embodiments are described below. Similar reference numbers are used to identify similar components in the various drawings and illustrated embodiments. It is understood that additional operations may be provided before, during, and after the method, and some of the described operations may be replaced or deleted for other embodiments of the method.

In the present disclosure, directions are not limited to three axes of a rectangular coordinate system, such as X-axis, Y-axis, and Z-axis. The direction can be interpreted in a broader sense. For example, the X-axis, Y-axis, and Z-axis may be perpendicular to each other, or may represent different directions that are not perpendicular to each other. For illustrative purposes, in the following, the X-axis direction is a length direction, the Y-axis direction is a width direction, and the Z-axis direction is a thickness direction. In the embodiments of the present disclosure, the Z-axis direction is a normal direction of a substrate. In the embodiment of the present disclosure, a schematic top view refers to a schematic diagram observing an XY plane. In some embodiments, a first direction D1, a second direction D2, and a third direction D3 may be directions located on the XY plane. In some embodiments, dimensions in different directions may be measured by optical images, such as scanning electron microscope (SEM) images.

The electronic device of the present disclosure may include a display device, a backlight device, an antenna device, a sensing device, or a splicing device, but the present disclosure is not limited thereto. The electronic device may be a bendable or flexible electronic device. The display device may be a non-self-luminous display device or a self-luminous display device. The antenna device may be a liquid crystal antenna or a non-liquid crystal antenna, the sensing device may be a sensing device for sensing capacitance, light, heat or ultrasonic, but the present disclosure is not limited thereto. Electronic components may include passive components and active components, such as capacitors, resistors, inductors, diodes, transistors, and the like. The diodes may include light-emitting diodes or photodiodes. The light-emitting diodes may include organic light-emitting diodes or inorganic light-emitting diodes. The light-emitting diodes may include, for example, organic light-emitting diodes (OLED), mini light-emitting diodes (mini LED), micro light-emitting diodes (micro LED), or quantum dot light-emitting diodes (quantum dot LED), but the present disclosure is not limited thereto. The splicing device may include, for example, a display splicing device or an antenna splicing device, but the present disclosure is not limited thereto. It should be noted that the electronic device may be any combination of the foregoing, but the present disclosure is not limited thereto. In the following, a display device will be used as an electronic device or a splicing device to illustrate the disclosure, but the disclosure is not limited thereto.

In addition, a shape of the electronic device may be a rectangle, a circle, a polygon, a shape with curved edges, or other suitable shapes. The electronic device may have peripheral systems such as a processing system, a driving system, a control system, a light source system, a shelf system, etc. to support the display device or splicing device. It should be noted that the electronic device may be any combination of the foregoing, but the disclosure is not limited thereto.

Figure 1:
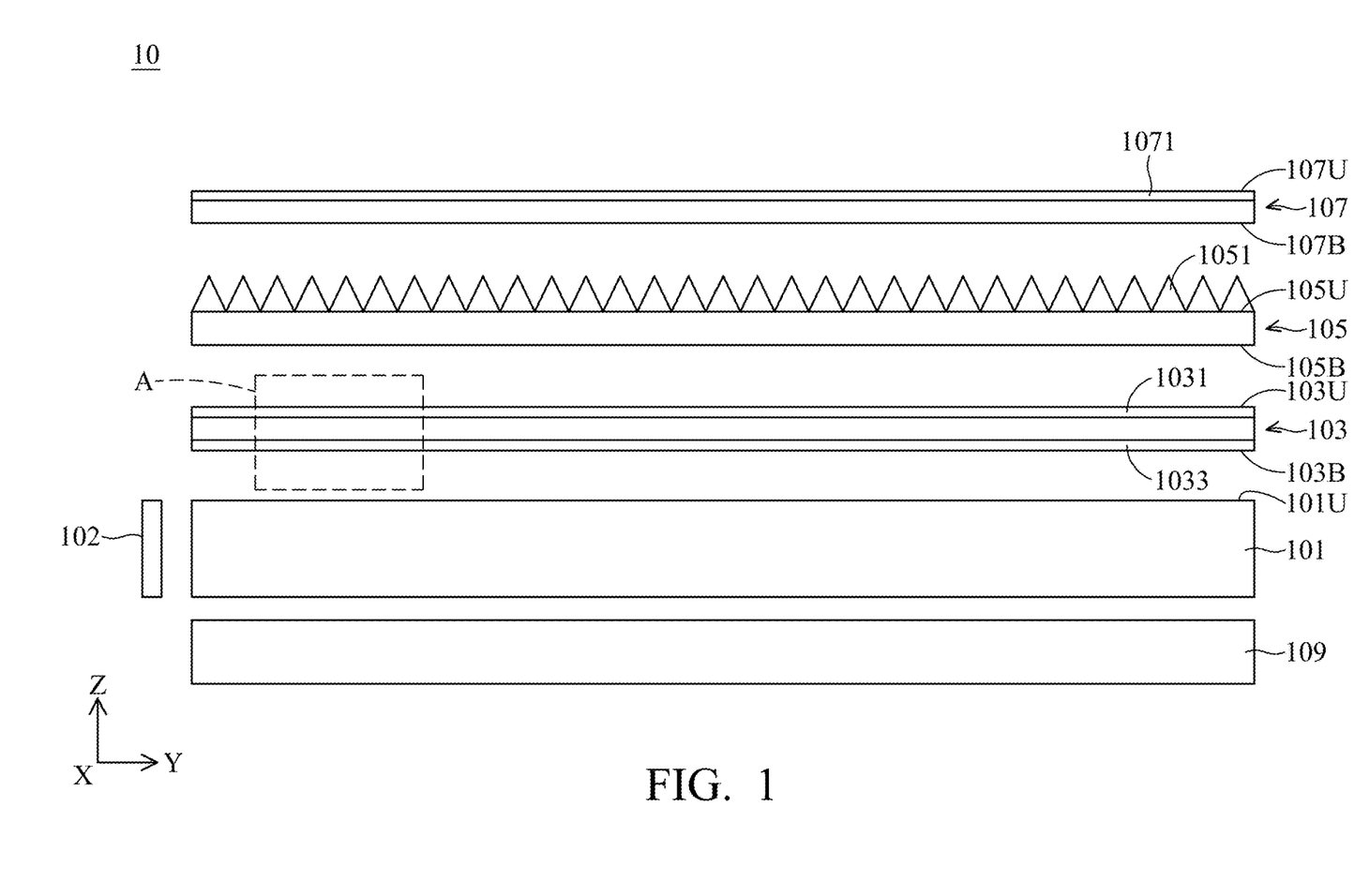
FIG. 1 is a schematic cross-sectional view of a backlight module according to an embodiment of the present disclosure.

The electronic device of the present disclosure includes a backlight module. FIG. 1 is a schematic cross-sectional view of a backlight module 10 according to an embodiment of the present disclosure. As shown in FIG. 1, the backlight module 10 includes a light guide plate 101, a light pattern adjustment component 103 disposed on the light guide plate 101, and a light source 102 disposed on a side of the light guide plate 101. The light source 102 extends, for example, along a first direction (for example, the X direction in FIG. 1). In some embodiments, the light guide plate 101 may have a light exit surface 101U, and the light pattern adjustment component 103 is disposed on the light guide plate 101 and adjacent to the light exit surface 101U of the light guide plate 101. In some embodiments, the backlight module 10 further includes a first optical component 105 and a second optical component 107. The first optical component 105 is disposed on the light pattern adjustment component 103, and the second optical component 107 is disposed on the first optical component 105, but the present disclosure is not limited thereto. In other embodiments (not shown), other layers may optionally be inserted between the light pattern adjustment component 103 and the first optical component 105, or between the first optical component 105 and the second optical component 107. In some embodiments, the first optical component 105 is disposed between the light pattern adjustment component 103 and the second optical component 107 in a top view direction (e.g., Z direction). In some embodiments, the backlight module 10 may include a reflective member 109. The reflective member 109 is, for example, disposed below the light guide plate 101. In the top view direction (e.g., Z direction), the light guide plate 101 is disposed between the light pattern adjustment component 103 and the reflective member 109.

Figure 2A:
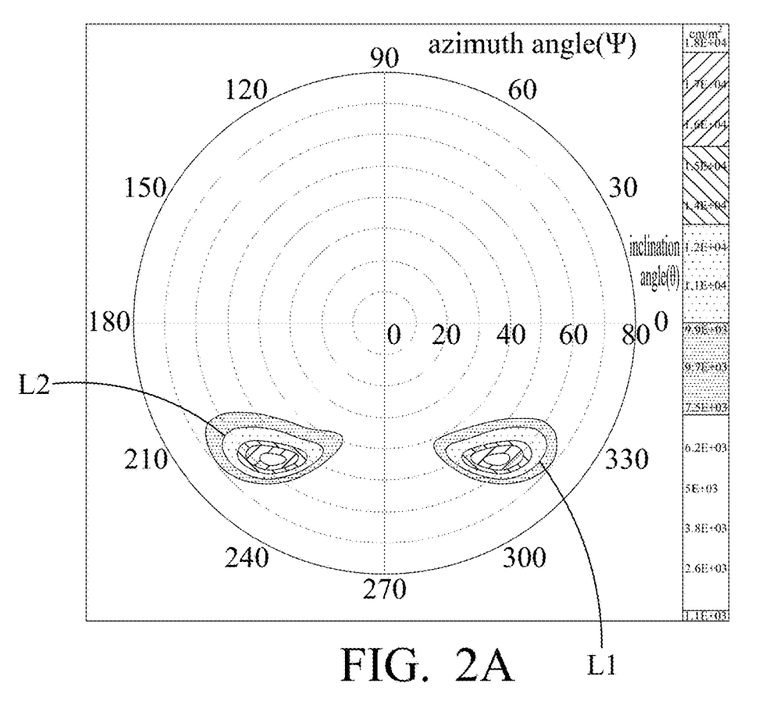
FIGS. 2A to 2C are optical analysis diagrams of electronic devices according to different embodiments of the present disclosure.
Figure 2B:
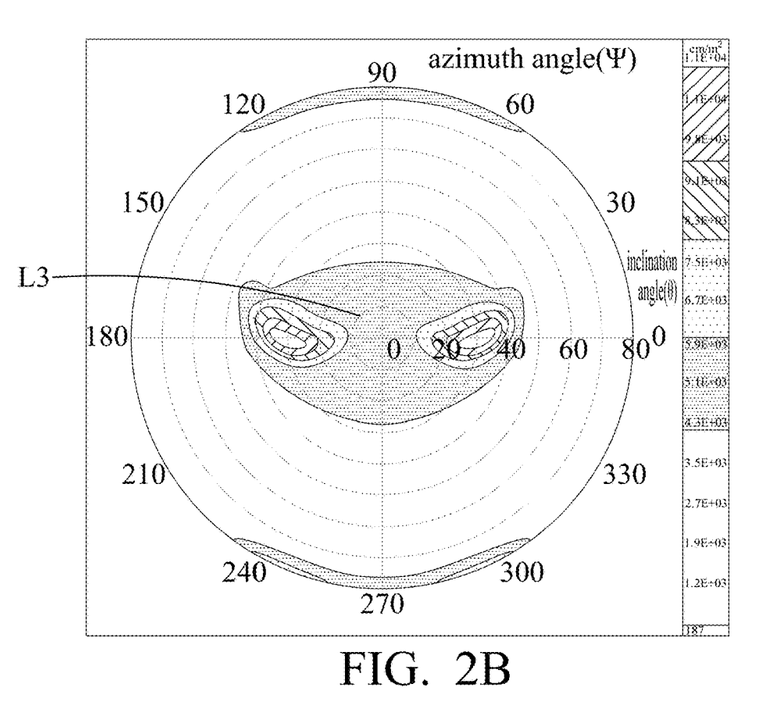
Figure 2C:
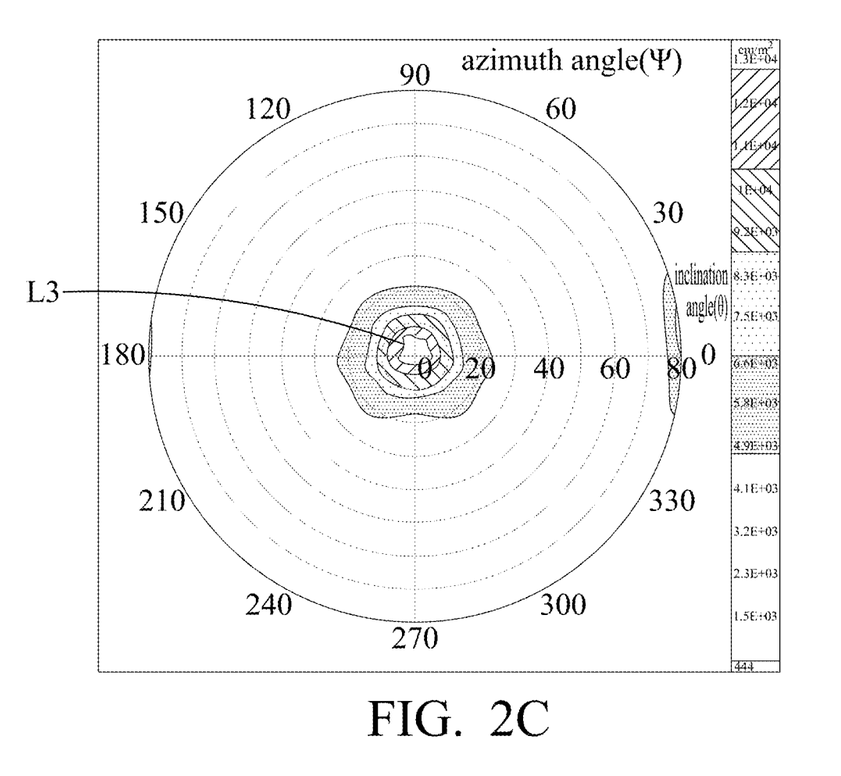

FIGS. 2A to 2C are optical analysis diagrams of electronic devices according to different embodiments of the present disclosure. FIG. 2A is an optical analysis diagram of an electronic device according to an embodiment of the present disclosure. The backlight module 10 in the electronic device of FIG. 2A includes, for example, a light guide plate 101, a light source 102, a reflective member 109 and a light pattern adjustment component 103, but does not include a first optical component 105 and a second optical component 107. FIG. 2B is an optical analysis diagram of an electronic device according to an embodiment of the present disclosure. The backlight module 10 in the electronic device of FIG. 2B includes a light guide plate 101, a light source 102, a reflective member 109, a light pattern adjustment component 103, and a first optical component 105, but does not include a second optical component 107. FIG. 2C is an optical analysis diagram of an electronic device according to an embodiment of the present disclosure. The backlight module 10 in the electronic device of FIG. 2C includes a light guide plate 101, a light source 102, a reflective member 109, a light pattern adjustment component 103, a first optical component 105, and a second optical component 107. The optical analysis diagrams of FIGS. 2A to 2C may include an azimuth angle ($\Psi$) and an inclination angle ($\theta$), where the azimuth angle ($\Psi$) is, for example, from 0 to 360 degrees, and the inclination angle (θ) is, for example, from 0 to 80 degrees, but the disclosure is not limited thereto. The optical analysis diagrams of FIGS. 2A to 2C are measured approximately corresponding to a center of the electronic device. The azimuth angle (Ψ) is, for example, the angle on the X direction-Y direction plane, and the X direction-Y direction plane is equivalent to the plane of the light exit surface 101U of the light guide plate 101.

The azimuth angle (Ψ) is, on the X direction-Y direction plane, the angle between a direction and the top view direction (for example, the Z direction). For example, an azimuth angle of 90 degrees represents that the direction is a direction towards the light source 102 (corresponding to the left half of FIG. 1), and the azimuth angle of 270 degrees represents, for example, the angle on the opposite side of the azimuth angle of 90 degrees (corresponding to the right half of FIG. 1). The inclination angle (θ) is the tilt angle between a direction and the top view direction (for example, the Z direction). For example, an inclination angle of 0 degrees represents that the direction is parallel to the top view direction (for example, the Z direction). A larger inclination angle means a larger tilt angle between the top view direction (for example, the Z direction).

As can be seen from FIG. 2A, in the case that the light from the light guide plate 101 passes through the light pattern adjustment component 103, the measured optical analysis diagram of the backlight may have, for example, two large light packets (such as a light packet L1 and a light packet L2). The light packet L1 approximately corresponds to an inclination angle of 40 degrees to 70 degrees, and an azimuth angle of 300 degrees to 330 degrees, for example, but the disclosure is not limited thereto. The light packet L2 approximately corresponds an inclination angle of 40 degrees to 70 degrees and an azimuth angle of 210 degrees to 240 degrees, but the disclosure is not limited thereto. The inclination angle and the azimuth angle corresponding to the light packets (the light packet L1 and the light packet L2) will be modulated according to the design of the backlight module 10.

As can be seen from FIG. 2B, in the case that the light from the light guide plate 101 passes through the light pattern adjustment component 103 and the first optical component 105, the two split light packets (the light packet L1 and the light packet L2), for example, move towards a positive viewing angle (for example, the inclination angle close to 0 degrees to 30 degrees). The two split light packets (the light packet L1 and the light packet L2) may be concentrated to form another light packet L3. The light packet L3, for example, approximately corresponds to an inclination angle of 0 degrees to 40 degrees and an azimuth angle of 0 degrees to 360 degrees, but the disclosure is not limited thereto. The inclination angle and the azimuth angle to which the light packages correspond may be changed according to the design of the backlight module 10.

As can be seen from FIG. 2C, in the case that the light from the light guide plate 101 passes through the light pattern adjustment component 103, the first optical component 105, and the second optical component 107, the light packet L3 may move towards a positive viewing angle of the electronic device (for example, the inclination angle close to 0 degrees to 30 degrees). That is, the light packet L3 is moved to a smaller inclination angle. The light packet L3 approximately corresponds to an inclination angle of 0 to 20 degrees and an azimuth angle of 0 to 360 degrees, for example, but the disclosure is not limited thereto. The inclination angle and the azimuth angle to which the light packages correspond may be changed according to the design of the backlight module 10. Since the light packet L3 approximately corresponds to an inclination angle of 0 degrees to 20 degrees and an azimuth angle of 0 degrees to 360 degrees, for example, the backlight module 10 may provide a light packet having a larger size. A better visual effect is achieved when the light emitted by the backlight module 10 is directed onto a panel. In addition, the backlight module 10 including the light pattern adjustment component 103, the first optical component 105, and the second optical component 107 may provide effects having a high contrast ratio and/or high front viewing angle brightness.

The structure of the first optical component 105 and the second optical component 107 in the backlight module 10 will be described in detail below with reference to FIG. 1.

As shown in FIG. 1, the first optical component 105 includes a first side 105B adjacent to the light guide plate 101 and a second side 105U away from the light guide plate 101. In some embodiments, the first optical component 105 may include a plurality of first prism structures 1051. The first prism structures 1051 are disposed, for example, on the second side 105U of the first optical component 105. The first prism structure 1051 has a prism structure protruding in a direction away from the light guide plate 101 (for example, a right prism structure). The first prism structure 1051 extends, for example, along a second direction. The second direction may be the same as or different from the first direction (such as the X direction in FIG. 1).

As shown in FIG. 1, the second optical component 107 includes a first side 107B adjacent to the light guide plate 101 and a second side 107U away from the light guide plate 101. In some embodiments, the second optical component 107 may include a plurality of second prism structures 1071. The second prism structures 1071 are, for example, disposed on the second side 107U of the second optical component 107, but the disclosure is not limited thereto. In some embodiments, the second optical component 107 has a plurality of second prism structures 1071 protruding toward a direction away from the light guide plate 101 (e.g., right prism structures). In some embodiments, the second prism structure 1071 extends, for example, along a third direction. The extension direction (e.g., the second direction) of one of the first prism structures 1051 may be different from the extension direction (e.g., the third direction) of one of the second prism structures 1071. In some embodiments, the extension direction of the first prism structure 1051 (e.g., the second direction) is, for example, perpendicular to the extension direction of the second prism structure 1071 (e.g., the third direction). In some embodiments, the angle between the extension direction of the first prism structure 1051 and the extension direction of the second prism structure 1071 is, for example, between 60 degrees and 90 degrees (60 degrees≤the angle≤90 degrees).

The structure of the light pattern adjustment component 103 in the backlight module 10 will be further described in detail below with reference to FIGS. 3(a) to 6(b).

Figure 3A:
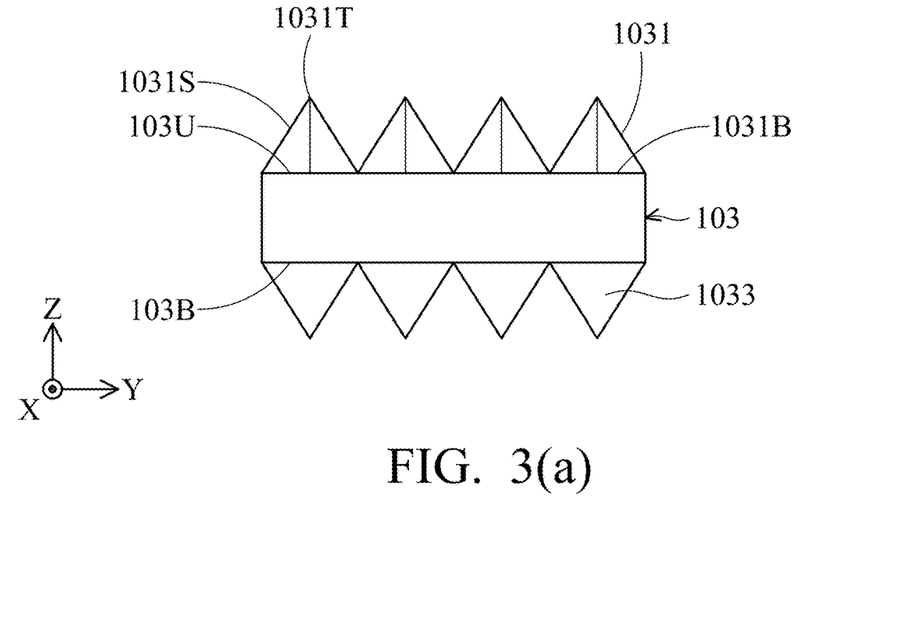
FIG. 3(a) is an enlarged view of an area A of the light pattern adjustment component of the electronic device of FIG. 1.
Figure 3B:
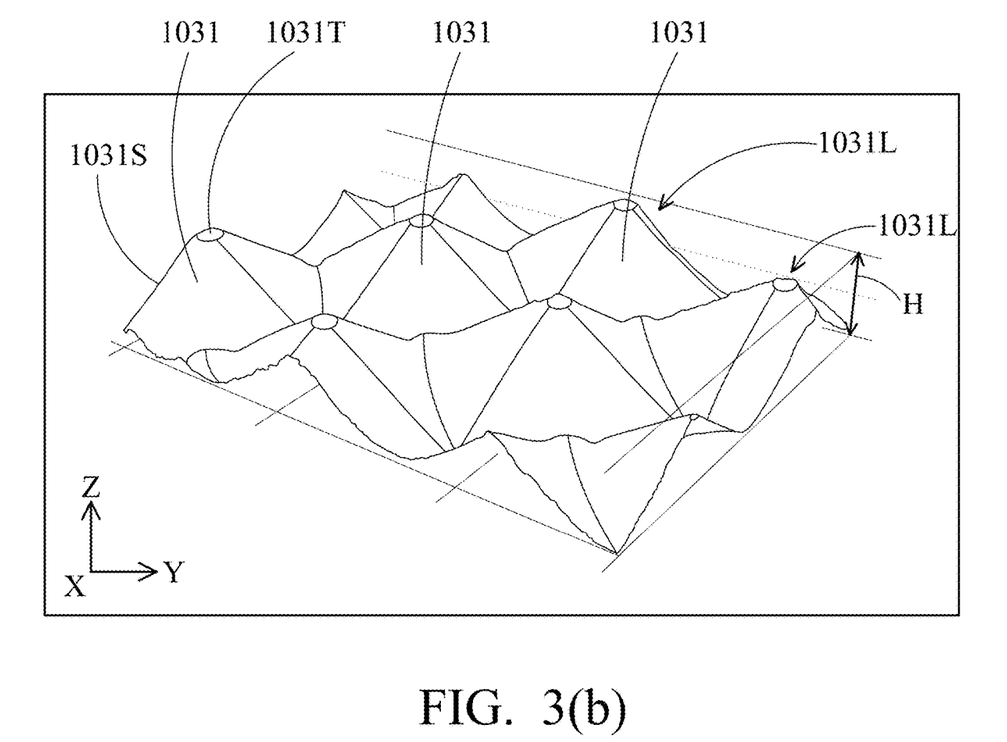
FIG. 3(b) is a schematic three-dimensional structural diagram of the area A of the light pattern adjustment component according to an embodiment of the present disclosure.
Figure 4:
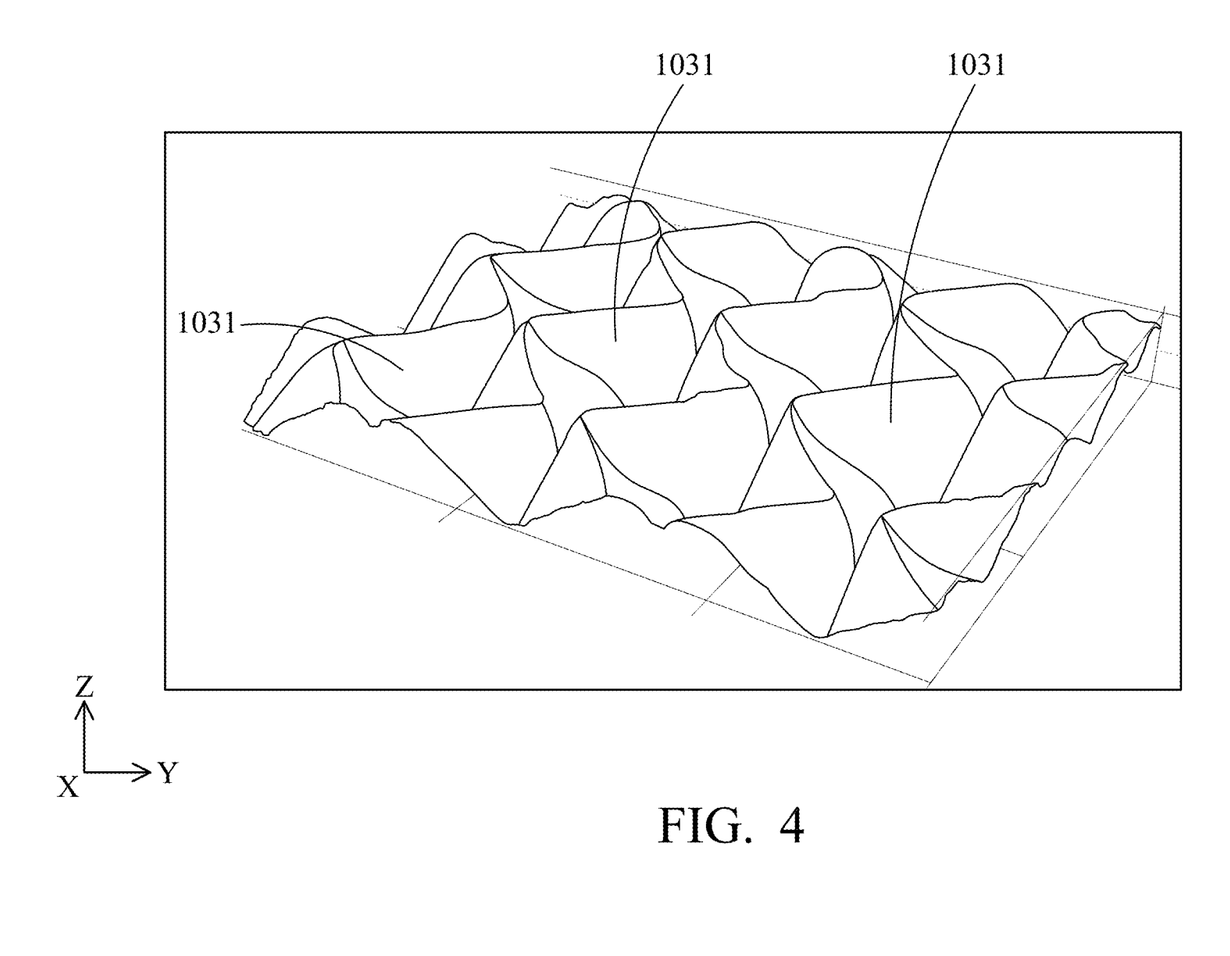
FIG. 4 is a schematic three-dimensional structural diagram of the area A of the light pattern adjustment component according to another embodiment of the present disclosure.
Figure 5A:
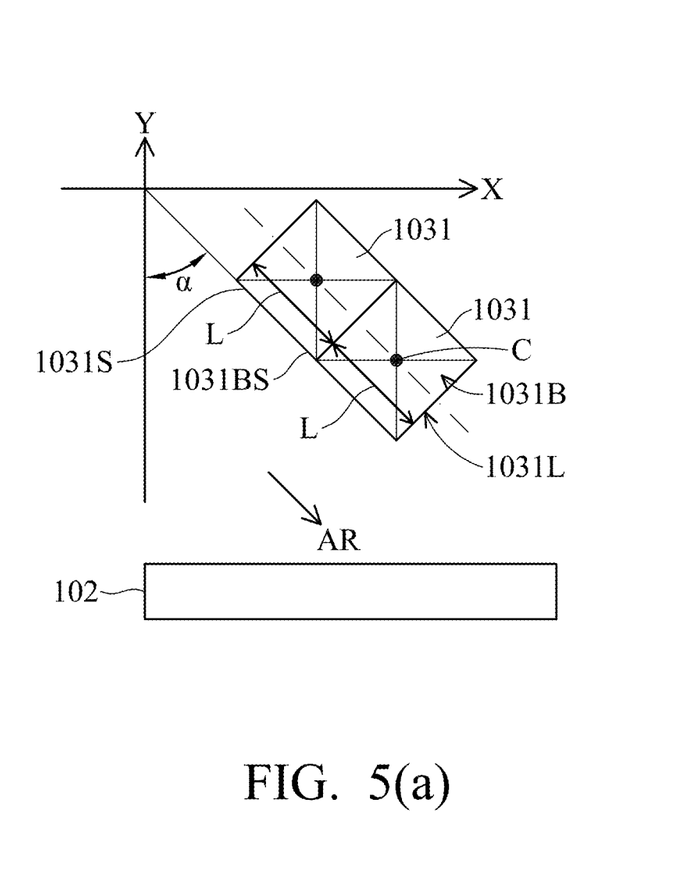
FIG. 5(a) is a schematic arrangement diagram of structural units of a light pattern adjustment component according to an embodiment of the present disclosure.
Figure 5B:
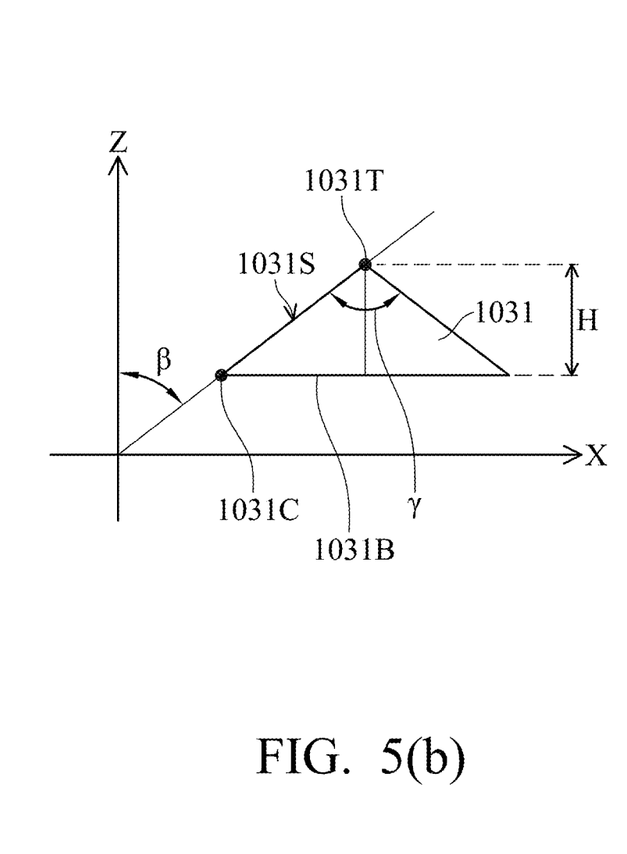
FIG. 5(b) is a schematic cross-sectional view of the structural units of the light pattern adjustment component according to an embodiment of the present disclosure.
Figure 6A:
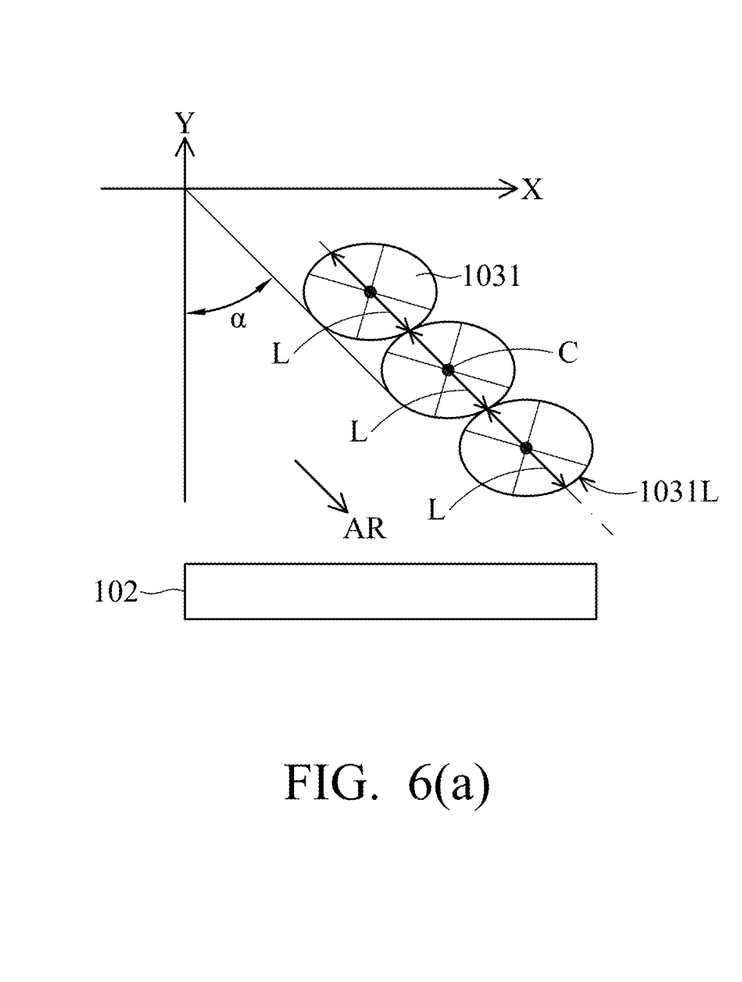
FIG. 6(a) is a schematic arrangement diagram of structural units of a light pattern adjustment component according to another embodiment of the present disclosure.
Figure 6B:
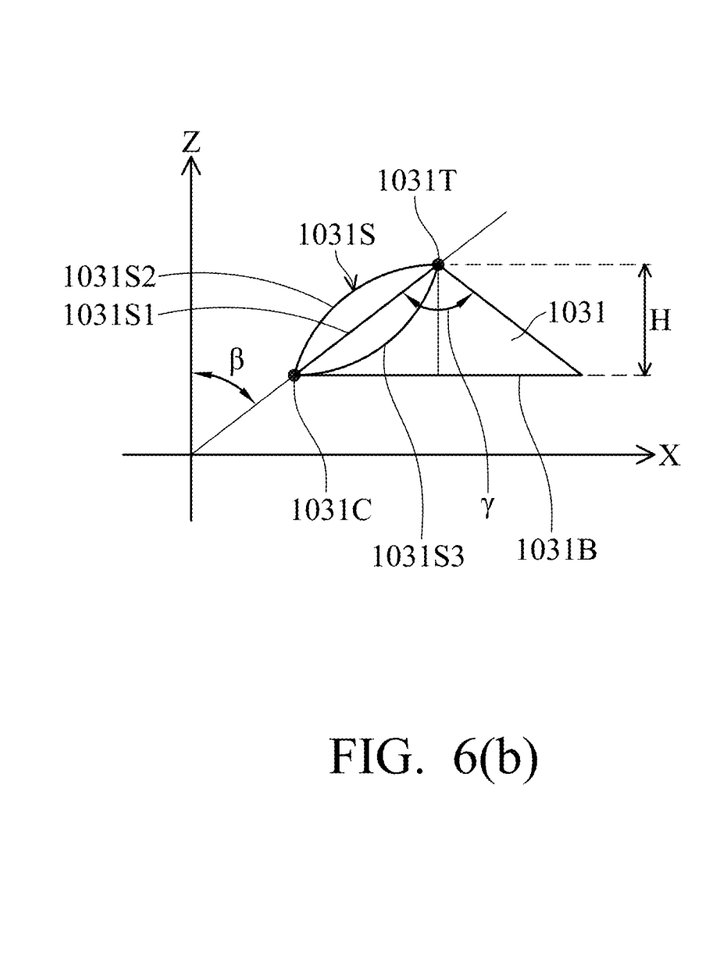
FIG. 6(b) is a schematic cross-sectional view of the structural units of the light pattern adjustment component according to another embodiment of the present disclosure.

FIG. 3(a) is an enlarged view of an area A of the light pattern adjustment component 103 of the electronic device of FIG. 1. FIG. 3(b) is a schematic three-dimensional structural diagram of the area A of the light pattern adjustment component 103 according to an embodiment of the present disclosure. FIG. 4 is a schematic three-dimensional structural diagram of the area A of the light pattern adjustment component 103 according to another embodiment of the present disclosure. FIG. 5(a) is a schematic arrangement diagram of the structural units 1031 of the light pattern adjustment component 103 according to an embodiment of the present disclosure. FIG. 5(b) is a schematic cross-sectional view of the structural unit 1031 of the light pattern adjustment component 103 according to an embodiment of the present disclosure. FIG. 6(a) is a schematic arrangement diagram of the structural units 1031 of the light pattern adjustment component 103 according to another embodiment of the present disclosure. FIG. 6(b) is a schematic cross-sectional view of the structural unit 1031 of the light pattern adjustment component 103 according to another embodiment of the present disclosure.

Referring to FIG. 1, the light pattern adjustment component 103 includes a first side 103B adjacent to the light guide plate 101 and a second side 103U away from the light guide plate 101. In some embodiments, the first side 103B may have a plurality of prismatic structures 1033. In some embodiments, the second side 103U may have a plurality of structural unit rows 1031L. Each of the structural unit rows 1031L includes a plurality of structural units 1031, as shown in FIG. 1 and FIG. 3(a). In some embodiments, the structural units 1031 may be protruding structures protruding in a direction away from the light guide plate 101, as shown in FIG. 3(b), but the disclosure is not limited thereto. In some embodiments, the structural units 1031 may be recessed structures that are recessed toward the light guide plate 101, as shown in FIG. 4, but the disclosure is not limited thereto.

The following takes the structural units 1031 as protruding structures protruding in a direction away from the light guide plate 101 as an example. The structural units 1031 will be described with reference to FIGS. 5 and 6.

As shown in FIGS. 3(a), 3(b), 5(a), 5(b), 6(a) and 6(b), the structural unit 1031 may have a bottom surface 1031B adjacent to the second side 103U, a vertex 1031T opposite the bottom surface 1031B, and a side surface 1031S connecting the vertex 1031T and the bottom surface 1031B. In some embodiments, the outline of the bottom surface 1031B of the structural unit 1031 may have various shapes as seen from the top view direction of the electronic device. In some embodiments, as shown in FIG. 5(a), the outline of the bottom surface 1031B of the structural unit 1031 may have a square or rectangular shape (including, but not limited to, a rectangular shape, a rhombus shape) as seen from the top view direction of the electronic device, but the disclosure is not limited thereto. In some embodiments, as shown in FIG. 6(a), the outline of the bottom surface 1031B of the structural unit 1031 may have an elliptical, a circular or another suitable shape as seen from the top view direction of the electronic device.

In some embodiments, the projection of the vertex 1031T of the structural unit 1031 on the bottom surface 1031B is defined as the center point C of the bottom surface 1031B. In some embodiments, the maximum length L of the bottom surface 1031B passing through the center point C may, for example, be greater than or equal to 0 μm and less than or equal to 100 μm, but the disclosure is not limited thereto. In some embodiments, the maximum length L of the bottom surface 1031B passing through the center point C may, for example, be greater than or equal to 0 μm and less than or equal to 90 μm. In some embodiments, the maximum length L of the bottom surface 1031B passing through this center point C may, for example, be greater than or equal to 0 μm and less than or equal to 80 μm. In some embodiments, the height H of the structural unit 1031 is, for example, less than or equal to 50 μm. That is, in the top view direction (such as the Z direction), a vertical distance between the bottom surface 1031B and the vertex 1031T of the structural unit 1031 may be less than or equal to 50 μm. In some embodiments, the height H of the structural unit 1031 is, for example, less than or equal to 45 μm. In some embodiments, the height H of the structural unit 1031 is, for example, less than or equal to 40 μm. In some embodiments, the structural units 1031 are arranged, for example, adjacent to each other. The structural units 1031 are arranged closely adjacent to each other (i.e., there is no gap between the structural units 1031), but the disclosure is not limited thereto. In other embodiments (not shown), there are gaps between the structural units 1031, but the disclosure is not limited thereto. In some embodiments, the structural units 1031 may be arranged regularly or irregularly. In some embodiments (as shown in FIG. 5(a)), the structural units 1031 are arranged in a structural unit row along, for example, an arrangement direction AR. FIG. 5(a) illustrates one row, but there are actually more rows. In some embodiments (as shown in FIG. 3(b)), the structural units 1031 in two adjacent structural unit rows 1031L may, for example, be displaced from each other. In some embodiments, for example, a connection direction of the center points C of the structural units 1031 in one structural unit row 1031L may be defined as the arrangement direction AR of the structural units 1031. In some embodiments (as shown in FIG. 5(a)), the bottom surface 1031B of the structural unit 1031 may have a bottom edge 1031BS as seen from the top view direction of the electronic device. An extension direction of the bottom edge 1031BS is, for example, substantially parallel to the arrangement direction AR, but the disclosure is not limited thereto.

In some embodiments (as shown in FIG. 3(a)), the prismatic structure 1033 extends, for example, along a fourth direction. The fourth direction may be the same as or different from the first direction, the second direction and/or the third direction, for example. In some embodiments (as shown in FIG. 5(a)), the angle α between the arrangement direction AR of the structural units 1031 in one of the structural unit rows 1031L and the extension direction (the Y direction) of one of the prismatic structures 1033 is within a range of 10-80° (10°≤ the angle α≤80), but the disclosure is not limited thereto. In some embodiments, the angle α is 15-75° (15°≤the angle α≤75°), 20-70° (20°≤ the angle α≤70°), or 25-65° (25°≤the angle α≤65).

In some embodiments, the angle (not shown, but approximately equal to the angle α in FIG. 5) between the extension direction (not shown) of the bottom edge 1031BS of the bottom surface 1031B of one of the structural units 1031 and, for example, the extension direction (the Y direction) of one of the prismatic structures 1033 is within a range of 10-80° (10°≤the angle≤80), within a range of 15-75° (15°≤the angle≤75°), within a range of 20-70° (20°≤the angle≤70°), or within a range of 25-65° (25°≤the angle≤65).

In some embodiments (as shown in FIG. 5(b)), the structural unit 1031 may have a vertex angle γ in the cross-sectional direction of the electronic device. The vertex angle γ is, for example, within a range of 80°-120° (80°≤the vertex angle γ≤120°), within a range of 85°-115° (85°≤the vertex angle γ≤115°), or within a range of 90°-110° (90°≤the vertex angle γ≤110°, but the disclosure is not limited thereto.

In some embodiments, in the cross-sectional direction of the electronic device, for example, an intersection 1031C is between the bottom surface 1031B and the side surface 1031S of the structural unit 1031. In other words, in the cross-sectional direction of the electronic device, the side surface 1031S of the structural unit 1031 connects the bottom surface 1031B and the vertex 1031T of the structural unit 1031 at the intersection 1031C, as shown in FIG. 5(b). In some embodiments, a profile of the side surface 1031S may be a straight line in the cross-sectional direction of the electronic device, as shown in FIG. 5(b), but the disclosure is not limited thereto. In some embodiments, in the cross-sectional direction of the electronic device, the profile of the side surface 1031S between the intersection point 1031C and the vertex 1031T may be a curved line (including a convex curved line or a concave curved line). Specifically, as shown in FIG. 6(b). In some embodiments, in the cross-sectional direction of the electronic device, the profile of the side surface 1031S between the intersection 1031C and the vertex 1031T may be a straight line 1301S1, a curved line (including a convex curved line 1031S2 or a concave curved line 1031S3). In some embodiments (as shown in FIGS. 5(b) and 6(b)), in the cross-sectional direction of the electronic device, the angle β is, for example, between the extension direction of the side surface 1031S of one of the structural units 1031 (i.e., an extension direction of a line connecting the intersection point 1031C and the vertex 1031T) and a normal direction (the Z direction) of the light exit surface 101U of the light guide plate 101. In some embodiments, the angle β is within a range of 45-85° (45°≤the angle β≤85°), within a range of 50-80° (50°≤the angle β≤80°), or within a range of 55-75° (55°≤the angle β≤75°.

In some embodiments, at least one of the light pattern adjustment component 103, the first optical component 105, and the second optical component 107 may include diffusion particles, textured structures, or hard coatings. For example (as shown in FIG. 1), the first side 105B and/or the second side 105U of the first optical component 105 may include diffusion particles, textured structures and/or hard coatings. For example (as shown in FIG. 1), the first side 107B and/or the second side 107U of the second optical component 107 may include diffusion particles, textured structures and/or hard coatings. For example (as shown in FIG. 1), the first side 103B and/or the second side 103U of the light pattern adjustment component 103 may include diffusion particles, textured structures and/or hard coatings. Diffusion particles, textured structures or hard coatings may provide a suitable haze to one or more of the first optical component 105, the second optical component 107 or the light pattern adjustment component 103. In some embodiments, a sum of the haze of the first optical component 105, the second optical component 107 and the light pattern adjustment component 103 may be 100%-150% (100%≤sum of haze≤150%) or 110%-140% (110%≤sum of haze≤140%), but the disclosure is not limited thereto. By adjusting a range of the sum of the haze, defects may be covered or an viewing quality may be improved.

In some embodiments, refractive indexes of the first optical component 105, the second optical component 107, and the light pattern adjustment component 103 are each between 1.53 and 1.69 (1.53≤the refractive index≤1.69), or between 1.53 and 1.67 (1.53≤the refractive index≤1.67), or between 1.50 and 1.65 (1.50≤the refractive index≤1.65), but the disclosure is not limited thereto. In some embodiments, the refractive indexes of the first optical component 105, the second optical component 107, and the light pattern adjustment component 103 may be different from each other or the same.

In some embodiments (as shown in FIG. 1), the extension direction of the light source 102 (i.e., the first direction, such as the X direction) is, for example, substantially perpendicular to the extension direction of the prismatic structure 1033 (i.e., the fourth direction). A traveling direction (for example, the Y direction) of the light emitted by the light source 102 may be substantially parallel to the extension direction of the prismatic structure 1033 (for example, the Y direction). That is, the angle between the extension direction of the light source 102 (i.e., the first direction, such as the X direction) and the extension direction of the prismatic structure 1033 (e.g., the Y direction) may be 90°, but the disclosure is not limited thereto. In some embodiments, the extension direction of the light source 102 (i.e., the first direction) may be substantially parallel to the extension direction of the first prism structure 1051 (i.e., the second direction). The traveling direction (e.g., the Y direction) of the light emitted by the light source 102 may be substantially perpendicular to the extension direction of the first prism structure 1051 (i.e., the second direction), but the disclosure is not limited thereto. That is, the angle between the extension direction of the light source 102 (e.g., the X direction) and the extension direction of the first prism structure 1051 (i.e., the second direction) may be 0°, but the disclosure is not limited thereto. In some embodiments, the extension direction of the light source 102 (i.e., the first direction) may be substantially perpendicular to the extension direction of the second prism structure 1071 (i.e., the third direction). The traveling direction of the light emitted by the light source 102 may be substantially parallel to the extension direction of the second prism structure 1071. That is, the angle between the extension direction of the light source 102 (i.e., the first direction) and the extension direction of the second prism structure 1071 (i.e., the third direction) may be 90°, but the disclosure is not limited thereto.

In some embodiments, in the case that the angle between the extension direction of the prismatic structure 1033 and the extension direction of the first prism structure 1051 and the angle between the extension direction of the second prism structure 1071 and the extension direction of the first prism structure 1051 are approximately 90°, and the angle between the extension direction of the prismatic structure 1033 and the extension direction of the second prism structure 1071 is approximately 0°, the angle between the extension direction of the light source 102 (for example, the first direction) and the extension direction of the prismatic structure 1033 (or the extension direction of the second prism structure 1071) may be within a range of 50 to 130° (50°≤the angle≤130°, i.e., 90°±40°), within a range of 55 to 125° (55°≤the angle≤125°, i.e., 90°±35°), or within a range of 60 to 120° (60°≤the angle≤120°, i.e., 90°±30°). In some embodiments, the angle between the extension direction of the light source 102 (for example, the first direction) and the extension direction of the first prism structure 1051 may be within a range of −40 to 40° (−40°≤the angle≤40°, i.e., 9-0°±40°), within a range of −35 to 35° (−35°≤the angle≤35°, i.e., 9-0°±35°), or within a range of −30 to 30° (−30°≤the angle≤−30°, i.e., −0°±30°).

In some embodiments, the angle between the extension direction of the second prism structure 1071 and the extension direction of the first prism structure 1051 may be within a range of 80-100° (80°≤the angle≤100°), for example, the angle may be 90°. The angle between the extension direction of the prismatic structure 1033 and the extension direction of the first prism structure 1051 may be within a range of 80-100° (80°≤the angle≤100°), for example, the angle may be 90°. The angle between the extension direction of the prismatic structure 1033 and the extension direction of the second prism structure 1071 may be in the range of −10-10° (−10° the angle≤10°), for example, the angle may be 0°.

Figure 7:
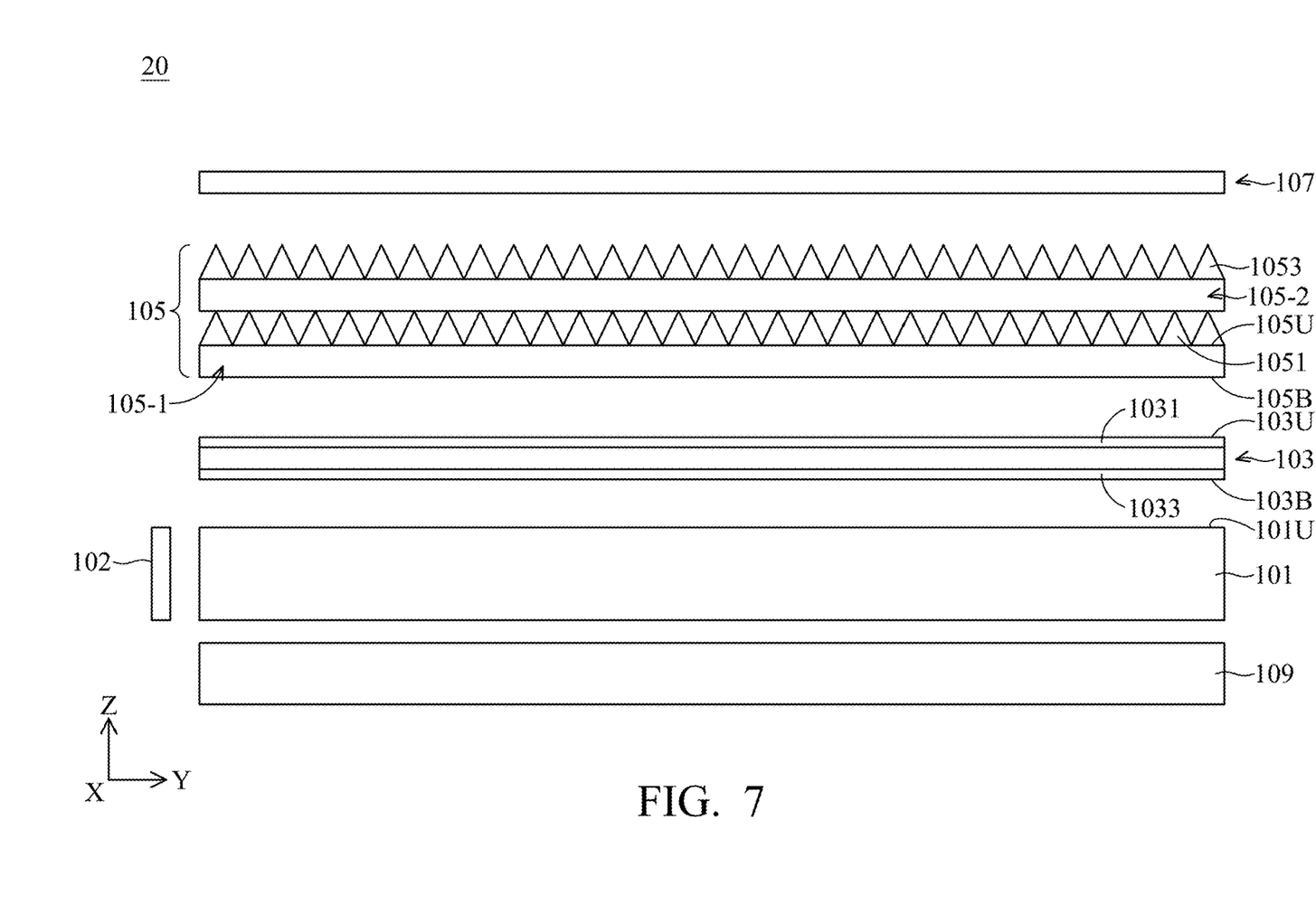
FIG. 7 is a schematic cross-sectional view of a backlight module according to another embodiment of the present disclosure.

FIG. 7 is a schematic cross-sectional view of a backlight module 20 according to another embodiment of the present disclosure. As shown in FIG. 7, the backlight module 20 includes a light guide plate 101, a light pattern adjustment component 103 disposed on the light guide plate 101, a first optical component 105 disposed on the light pattern adjustment component 103, a second optical component 107 disposed on the first optical component 105, a reflective member 109 disposed below the light guide plate 101, and a light source 102 disposed on a side of the light guide plate 101 and extending along the first direction. Except for the first optical component 105 and the second optical component 107, the backlight module 20 shown in FIG. 7 has the same structure as the backlight module 10 shown in FIG. 1. Therefore, only the first optical component 105 and the second optical component 107 will be described below.

As shown in FIG. 7, the first optical component 105 includes a composite layer structure. The first optical component 105 may include a base substrate 105-1, a base substrate 105-2, a first prism structure 1051 and a plurality of prism structures 1053, but the present disclosure is not limited thereto. The first prism structure 1051 is, for example, disposed on the base substrate 105-1. The first prism structure 1051 may have, for example, right prism structures protruding in a direction away from the light guide plate 101. The prism structure 1053 may be, for example, disposed on the base substrate 105-2. The prism structure 1053 may have, for example, right prism structures protruding in a direction away from the light guide plate 101. The prism structure 1053 may be, for example, disposed on the first prism structure 1051, and the base substrate 105-2 may be, for example, disposed between the first prism structure 1051 and the prism structure 1053. In the Z direction, the first prism structure 1051 may be disposed between the prism structure 1053 and the light pattern adjustment component 103. In some embodiments (as shown in FIG. 7), the extension direction of the prism structure 1053 may be substantially perpendicular to the extension direction of the first prism structure 1051. In some embodiments (as shown in FIG. 7), the extension direction of the first prism structure 1051 may be substantially parallel to the extension direction of the light source 102, but the disclosure is not limited thereto. In some embodiments (as shown in FIG. 7), the angle between the extension direction of the first prism structure 1051 and the extension direction of the light source 102 may within a range of 0-40° (0°≤the angle≤40°), but the disclosure is not limited thereto. In some embodiments (as shown in FIG. 7), the first prism structures 1051 and the prism structures 1053 (or the base substrate 105-2) may be fixed to each other by an attachment member (not shown). In some embodiments (as shown in FIG. 7), the second optical component 107 may not include the second prism structure 1071. The second optical component 107 may include, for example, diffusion particles, textured structures, or hard coating. In some embodiments (not shown), in the case that the first optical component 105 includes the prism structure 1053, the second optical component 107 may be omitted.

In some embodiments, the extension direction of the light source 102 (i.e., the first direction) may be substantially perpendicular to the extension direction of the prism structure 1053, for example.

In the case that the angle between the extension direction of the prismatic structure 1033 and the extension direction of the first prism structure 1051 and the angle between the extension direction of the prism structure 1053 and the extension direction of the first prism structure 1051 are approximately 90°, and the angle between the extension direction of the prismatic structure 1033 and the extension direction of the prism structure 1053 is approximately 0°, the angle between the extension direction of the light source 102 and the extension direction of the prism structure 1053 may be within a range of 50 to 130° (50° the angle≤130°, i.e., 90°±40°), within a range of 55 to 125° (55°≤the angle≤125°, i.e., 90°±35°)°, or within a range of 60 to 120° (60°≤the angle≤120°, i.e., 90°±30°).

In some embodiments, the angle between the extension direction of prism structure 1053 and the extension direction of the first prism structure 1051 may be within a range of 80-100° (80°≤the angle≤100°), for example, the angle may be 90°. The angle between the extension direction of the prismatic structure 1033 and the extension direction of the prism structure 1053 may be in the range of −10-10° (−10°≤the angle≤10°), for example, the angle may be 0°, but the disclosure is not limited thereto.

The following is a comparison between specific embodiments of the present disclosure and comparative examples to further illustrate the advantages of the electronic device of the present disclosure.

As a specific embodiment, a backlight module in an electronic device includes a light guide plate 101, a light source 102, a reflective member 109, a first optical component 105, a second optical component 107, and a light pattern adjustment component 103. The first optical component 105 includes a plurality of first prism structures 1051 disposed on a side of the first optical component 105 away from the light guide plate 101. The second optical component 107 includes a plurality of second prism structures 1071 disposed on a side of the second optical component 107 away from the light guide plate. The light pattern adjustment component 103 is disposed adjacent to the light guide plate 101 and includes prismatic structures 1033 disposed on a side of the light pattern adjustment component 103 adjacent to the light guide plate 101 and structural units 1031 disposed on a side of the light pattern adjustment component 103 away from the light guide plate 101. The structural units 1031 are arranged into a plurality of structural unit rows 1031L along an arrangement direction AR. The angle between the arrangement direction AR and the extension direction of the prismatic structure 1033 is 10 to 80° (the angle is, for example, 45°, 50° or 55°, but the disclosure is not limited thereto). For example, the first prism structure 1051 and the second prism structure 1071 have a right prism structure protruding in a direction away from the light guide plate 101, and the structural units 1031 has a reverse prism structure protruding in a direction towards to the light guide plate 101.

In summary, the electronic device provided according to some embodiments of the present disclosure includes a plurality of structural units disposed on the side of the light pattern adjustment component away from the light guide plate. The electronic device of the present disclosure may have one or more of the advantages of high display quality (including high contrast or high brightness), high rotation tolerance of optical components, no color shift at various viewing angles, large viewing angle, and/or compliance with TCO specifications. According to some embodiments, electronic devices may also be manufactured at lower costs.

While the disclosure has been described by way of example and in terms of the preferred embodiments, it should be understood that the disclosure that changes, substitutions and modifications may be made without departing from the spirit and scope of the disclosure. In addition, the protection scope of the present disclosure is not limited to the processes, machines, fabrications, compositions, devices, methods and steps in the specific embodiments described in the specification. According to the embodiments of the present disclosure, a person of ordinary skill in the art may understand that current or future processes, machines, fabrications, compositions, devices, methods and steps capable of performing substantially the same functions or achieving substantially the same results may be used in the embodiments of the present disclosure. Therefore, the protection scope of the present disclosure includes the above-mentioned processes, machines, fabrications, compositions, devices, methods and steps. In addition, features of different embodiments may be used together arbitrary as long as they do not violate the spirit of the disclosure or conflict with each other. Each claim constitutes an individual embodiment, and the protection scope of the present disclosure includes the combination of the claims and embodiments.

What is claimed is:

1. An electronic device, comprising: a backlight module comprising: a light guide plate; and a light pattern adjustment component disposed adjacent to the light guide plate and comprising a common substrate; wherein a side of the common substrate which is adjacent to the light guide plate has a plurality of prismatic structures, a side of the common substrate which is away from the light guide plate has a plurality of structural unit rows, each of the plurality of structural unit rows comprises a plurality of structural units, and an angle between an arrangement direction of the structural units in one of the plurality of structural unit rows and an extension direction of one of the plurality of prismatic structures is within a range of 10-80°.

2. The electronic device as claimed in claim 1, wherein the angle between the arrangement direction of the structural units in one of the plurality of structural unit rows and the extension direction of the one of the plurality of prismatic structures is within a range of 25-65°.

3. The electronic device as claimed in claim 1, wherein in a cross-sectional direction of the electronic device, an angle between an extension direction of a side surface of one of the structural units and a normal direction of a light exit surface of the light guide plate is within a range of 45-85°.

4. The electronic device as claimed in claim 3, wherein in the cross-sectional direction of the electronic device, a profile of the side surface is a straight line or a curved line.

5. The electronic device as claimed in claim 1, wherein as seen from the top view direction of the electronic device, an angle between an extension direction of a bottom edge of a bottom surface of one of the structural units and the extension direction of the one of the plurality of prismatic structures is within a range of 25-65°.

6. The electronic device as claimed in claim 1, wherein the plurality of structural units in two adjacent rows of the plurality of structural unit rows are displaced from each other.

7. The electronic device as claimed in claim 1, wherein the plurality of structural units are protruding structures protruding in a direction away from the light guide plate.

8. The electronic device as claimed in claim 1, wherein the plurality of structural units are recessed structures that are recessed toward the light guide plate.

9. The electronic device as claimed in claim 1, wherein the backlight module further comprises:
a first optical component disposed on the light pattern adjustment component; and
a second optical component disposed on the first optical component,
wherein the first optical component has first prism structures protruding in a direction away from the light guide plate, the second optical component has second prism structures protruding in the direction away from the light guide plate, and an extension direction of one of the first prism structures is different from an extension direction of one of the second prism structures.

10. The electronic device as claimed in claim 9, wherein at least one of the light pattern adjustment component, the first optical component, and the second optical component comprises diffusion particles, textured structures, or hard coatings.

11. The electronic device as claimed in claim 9, wherein the backlight module further comprises a light source disposed on a side of the light guide plate and extending along a direction which is parallel to the extension direction of the one of the first prism structures.

12. The electronic device as claimed in claim 9, wherein the backlight module further comprises a light source disposed on a side of the light guide plate and extending along a direction which is perpendicular to the extension direction of the one of the second prism structures.

13. The electronic device as claimed in claim 9, wherein the first optical component further comprises a first base substrate and a second base substrate on which third prism structures are disposed, the first prism structures are disposed on the first base substrate, and the second base substrate is between the third prism structures and the first prism structures.

14. The electronic device as claimed in claim 13, wherein the first prism structures are between the third prism structures and the light pattern adjustment component.

15. The electronic device as claimed in claim 1, wherein the backlight module further comprises a reflective member, and the light guide plate is disposed between the light pattern adjustment component and the reflective member.

16. The electronic device as claimed in claim 1, wherein the backlight module further comprises a light source disposed on a side of the light guide plate and extending along a direction which is perpendicular to the extension direction of the one of the plurality of prismatic structures.

17. The electronic device as claimed in claim 1, wherein an outline of the bottom surface of the structural unit has an elliptical, a circular or another suitable shape as seen from the top view direction of the electronic device.

18. The electronic device as claimed in claim 1, wherein an outline of the bottom surface of the structural unit has a square or rectangular shape as seen from the top view direction of the electronic device.

19. The electronic device as claimed in claim 1, wherein a height of one of the plurality of structural units is less than or equal to 50 µm.

20. The electronic device as claimed in claim 1, wherein in the cross-sectional direction of the electronic device, one of the plurality of structural units has a vertex angle within a range of 80°-120°.

* * * * *